United States Patent [19]

Akai

[11] Patent Number: 4,645,306

[45] Date of Patent: Feb. 24, 1987

[54] SEALING ELEMENT FOR INJECTION HOLE

[75] Inventor: Toshio Akai, Nara, Japan

[73] Assignee: Sharp Kabushiki Kaisha, Osaka, Japan

[21] Appl. No.: 788,680

[22] Filed: Oct. 18, 1985

Related U.S. Application Data

[63] Continuation of Ser. No. 641,935, Aug. 20, 1984, abandoned, which is a continuation of Ser. No. 393,876, Jun. 30, 1982, abandoned, which is a continuation of Ser. No. 143,017, Apr. 23, 1980, abandoned.

[30] Foreign Application Priority Data

Apr. 27, 1979 [JP] Japan .................................. 54-52697

[51] Int. Cl.[4] .................................................. G02F 1/17

[52] U.S. Cl. .................................... 350/355; 350/343; 350/344; 350/357

[58] Field of Search ............... 350/343, 344, 357, 362, 350/363, 334, 353, 355, 356

[56] References Cited

U.S. PATENT DOCUMENTS 3,771,855 11/1973 Burns .................................. 350/343
3,799,649 3/1974 Carlyle ................................ 350/343
3,886,014 5/1975 Bayer .................................. 350/344
3,990,782 11/1976 Yamasaki ............................ 350/343
3,995,941 12/1976 Nagahara et al. ................... 350/343
4,039,253 8/1977 Jain ...................................... 350/357
4,188,095 2/1980 Nishimura et al. ................. 350/357
4,199,228 4/1980 Destannes et al. ................... 350/343
4,374,610 2/1983 Kuwagaki et al. ................. 350/357
4,469,410 9/1984 Ikesue ................................. 350/343

FOREIGN PATENT DOCUMENTS 2163043 6/1973 Fed. Rep. of Germany ...... 350/344
0141151 11/1979 Japan .................................. 350/357

*Primary Examiner*—James W. Davie
*Attorney, Agent, or Firm*—Birch, Stewart, Kolasch & Birch

[57] ABSTRACT

A display cell comprises first and second substrates, an injection hole, an element for narrowing the distance between the injection hole and its confronting plate as compared to major parts of a compartment defined by the first and the second substrates. Since the separation in parts of the display cell adjacent the injection hole is small, a sealing member for sealing the injection hole has resistance to a mechanical shock applied to the display cell because of tight installation of the sealing member.

2 Claims, 3 Drawing Figures

4 5 1 2
3
6 3 1'

SEALING ELEMENT FOR INJECTION HOLE

This application is a continuation of application Ser. No. 641,935 filed Aug. 20, 1984 (not abandoned), which is a continuation of Ser. No. 393,876 filed June 30, 1982 (now abandoned), which is a continuation of Ser. No. 143,017 filed Apr. 23, 1980 (now abandoned).

BACKGROUND OF THE INVENTION

The present invention relates to a sealing element for an injection hole of a display device and, more particularly, to a sealing element for an injection hole of a display device such as an electrochromic display, an electrophoretic image display or the like, wherein an electrolyte is injected through the injection hole before it is sealed.

Normally, the electrochromic display and the electrophoretic image display were required to be several mm thick. Conventionally, an injection hole through which an electrolyte was injected into a cavity of the display was sealed by a synthetic resin. The installation of such a synthetic resin within the injection hole of a thick display cell was unstable particularly when subjected to mechanical shock so that the display had little reliability.

Therefore, it was desired that the reliability of such a display be enhanced as much as possible by improving the reliability of the sealing element.

SUMMARY OF THE INVENTION

Accordingly, it is an object of the present invention to provide an improved sealing element for an injection hole through which an electrolyte is injected to complete a display.

It is another object of the present invention to provide an improved sealing element for an injection hole adjacent to which a display becomes thinner than the remaining parts of the display, so that the injection hole is sealed to complete the display after an electrolyte is injected through the injection hole.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a display cell comprises first and second substrates, an injection hole, and an element for narrowing the distance between the injection hole and its confronting plate as compared to major parts of the compartment defined by the first and the second substrates. Since the separation in parts of the display cell adjacent the injection hole is small, the sealing member for sealing the injection hole will resist mechanical shock applied to the display cell because of tight installation of the sealing member.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

A sealing element of the present invention can be applied to any type of display device. Preferebly, such a sealing element is applied to a display having a considerably large thickness, e.g., in an amount of several mm. Such a display is an electrochromic display as disclosed, e.g., in Yano et al, U.S. Pat. No. 4,123,841, issued Nov. 7, 1978, entitled "ELECTROCHROMIC DISPLAY DEVICE MANUFACTURE METHOD" and an electrophoretic image display as disclosed, e.g., in Ota, U.S. Pat. No. 3,792,308, and the like.

Figure 1:
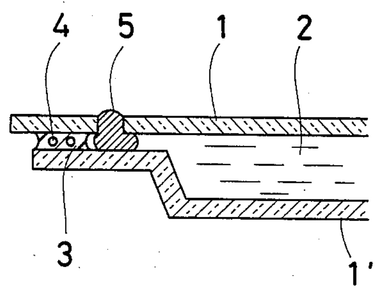
FIGS. 1 and 2 show a sectional view of a display embodying the present invention.
Figure 2:
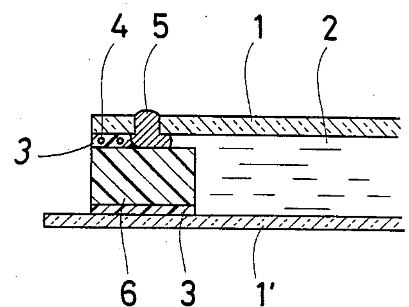

FIGS. 1 and 2 show a sectional view of a display cell in accordance with the present invention. Now with reference to FIG. 1, the display cell comprises a substrate 1, a dish-shaped substrate 1', an electrolyte 2, a seal member 3, spacer particles 4, and a sealing metal 5.

One or both of the substrate 1 and the dish-shaped substrate 1' may be made of a transparent material such as glass. They are adhered by the seal member 3. The spacer particles 4 are held in suspension in the seal member 3 to maintain a certain gap between the substrate 1 and the dish-shaped substrate 1' both adjacent to an injection hole for use with the electrolyte 2. The seal member 3 is formed on either of the substrates 1 and 1' by a method such as screen printing techniques. The diameter of the spacer particles 4 is, say, 10 m$\mu$, so that the gap between the two substrates 1 and 1' adjacent to the injection hole is similar as that in a conventional liquid crystal display. This is substantially identical to the condition where the display cell becomes thin.

The electrolyte 2 is injected through the injection hole by conventional techniques. The sealing metal 5 composed of a soft metal such as In or the like is introduced under a certain pressure to the injection hole.

FIG. 2 shows another type of display cell according to the present invention. Like elements corresponding to those of FIG. 1 are indicated by like numerals.

In FIG. 2, the numeral 1' represents another flat substrate rather than a dish-shaped substrate. Since such a dish-shaped substrate is not used, a spacer member 6 is additionally used to keep a certain distance between the substrates 1 and 1'. A spacer member 4 composed of glass fiber or the like is mixed within the seal member 3 adjacent to the injection hole to maintain a certain distance between the substrate 1 and the adjacent spacer 6 near the injection hole.

According to the present invention, it is unnecessary to amend the spacer member which is installed within the display cell. Since the part of the display cell adjacent to the injection hole is considerably thinner than the remaining part of the display cell, which is necessarily thick so as to contain electrode coloring for a visual display, the seal member for sealing the injection hole is resistant to a mechanical shock applied because of tight installation of the seal member, so that the reliability of the display cell is enhanced.

Figure 3:
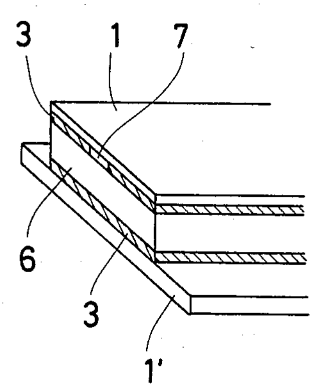
FIG. 3 shows a perspective view of another display embodying the present invention.

FIG. 3 indicates still another form of display cell according to the present invention. Like elements corresponding to those of FIG. 2 are represented by like numerals. An injection hole 7 is formed within the seal member 3 through which the electrolyte is injected. Then the injection hole 7 is sealed by a synthetic resin, a soft metal or the like.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A display cell having a peripheral portion for defining a channel for introducing an electrolyte into said cell and a central portion comprising a compartment for containing said electrolyte, with respective electrodes juxtapositioned to said compartment, said display cell comprising in combination:

first and second flat substrates having a spacer means positioned at said peripheral portion of said display cell for defining a space at said peripheral portion forming said channel for introduction of said electrolyte into said compartment between said first and second flat substrates said channel space being provided between an upper surface of said spacer means and said upper first substrate;

an injection hole provided at said peripheral portion of said cell within said first flat substrate for introducing said electrolyte into said space at the periphery of said device forming said channel;

means for sealing said peripheral portion of said cell while maintaining said injection hole open for introduction of said electrolyte into said central compartment, said sealing means comprising a sealing material containing spacer elements therein which spacer elements provide said channel between the respective surfaces of said spacer member and said first substrate; and means for sealing said injection hole.

2. The display cell of claim 1, wherein said spacer elements comprise glass fibers.

* * * * *